(12) United States Patent
Porter

(10) Patent No.: US 6,461,501 B1
(45) Date of Patent: Oct. 8, 2002

(54) ORNAMENTAL POND SKIMMER AND FILTER APPARATUS

(75) Inventor: C. Bradley Porter, Bixby, OK (US)

(73) Assignee: Hardscape Materials, Inc., Bixby, OK (US)

( * ) Notice: Subject to any disclaimer, the term of this patent is extended or adjusted under 35 U.S.C. 154(b) by 0 days.

(21) Appl. No.: 09/854,089

(22) Filed: May 11, 2001

(51) Int. Cl.[7] .......................... B01D 24/02; B01D 24/46
(52) U.S. Cl. .................. 210/167; 210/170; 210/232; 210/275; 210/290; 210/291; 210/416.1
(58) Field of Search .................. 210/167, 169, 210/170, 232, 269, 275, 290, 416.1, 291, 416.2

(56) References Cited

U.S. PATENT DOCUMENTS

| | | |
|---|---|---|
| 2,996,189 A | 8/1961 | Salterbach |
| 3,067,879 A | 12/1962 | Baker |
| 3,152,076 A * | 10/1964 | Kreutzer |
| 3,252,576 A | 5/1966 | Miller |
| 3,428,178 A | 2/1969 | Nash |
| 3,508,661 A | 4/1970 | Diemond et al. |
| 3,513,978 A | 5/1970 | Newsteder |
| 3,788,982 A | 1/1974 | Zsoldos, Jr. et al. |
| 3,815,160 A * | 6/1974 | Baker |
| 3,841,487 A | 10/1974 | Villette |
| 3,957,634 A | 5/1976 | Orensten et al. |
| 4,002,566 A | 1/1977 | Smith |
| 4,035,298 A | 7/1977 | Cloke et al. |
| 4,059,519 A | 11/1977 | Zieg |
| 4,127,485 A * | 11/1978 | Baker et al. |
| 4,151,810 A | 5/1979 | Wiggins |
| 4,348,281 A | 9/1982 | Perry et al. |
| 4,421,644 A | 12/1983 | Gedye |
| 4,426,286 A | 1/1984 | Puckett et al. |
| 4,498,984 A | 2/1985 | Colson |
| 4,606,822 A | 8/1986 | Miller |
| 4,627,118 A * | 12/1986 | Baker |
| 4,684,462 A | 8/1987 | Augustyniak |
| 4,783,258 A | 11/1988 | Willinger et al. |
| 4,818,389 A | 4/1989 | Tobias et al. |
| 4,826,591 A | 5/1989 | Macia |
| 4,915,828 A | 4/1990 | Meyers et al. |
| 5,083,528 A | 1/1992 | Strong |
| 5,084,164 A | 1/1992 | Del Rosario |
| 5,085,766 A | 2/1992 | Born |
| 5,171,438 A | 12/1992 | Korcz |
| 5,228,999 A | 7/1993 | Yang |
| 5,242,582 A | 9/1993 | Marioni |

(List continued on next page.)

OTHER PUBLICATIONS

Aquascape Designs, Inc. Catalog, Winter 2000. Batavia, IL.

Charleston Aquatic Nurseries. Catalog & Guide. Vol. 12, Johns Island, SC. 1998.

Primary Examiner—David A. Simmons
Assistant Examiner—Fred Prince
(74) Attorney, Agent, or Firm—Fellers, Snider, Blankenship, Bailey & Tippens, P.C.

(57) ABSTRACT

There is provided herein a new skimmer apparatus and a new filter mechanism for use in ornamental ponds and the like. According to a first preferred embodiment there is provided a skimmer apparatus which has an enclosing container with a lower terminus that has a perimeter that is larger than that of the upper terminus. This allows the skimmer to be weighted/locked down within the pond itself and substantially reduces or eliminates the risk that the skimmer will float upward if it is emptied of water. Additionally, there is provided a filter which includes a spline and grove combination to firmly attach a pond liner the filter underneath its snout. Further, there is provided a pond filter which contains a true sedimentation chamber within the bottom portion thereof. Finally, there is provided an adjustable-width skimmer snout.

21 Claims, 9 Drawing Sheets

U.S. PATENT DOCUMENTS

| | | |
|---|---|---|
| 5,277,800 A | 1/1994 | Dieckmann et al. |
| 5,285,538 A | 2/1994 | Hodak |
| 5,288,400 A | 2/1994 | Phillips |
| 5,306,421 A | 4/1994 | Weinstein |
| 5,328,602 A | 7/1994 | Brooks |
| 5,490,923 A | 2/1996 | Penney |
| 5,518,611 A | 5/1996 | Bresolin |
| 5,554,277 A | 9/1996 | Rief et al. |
| 5,571,409 A | 11/1996 | Scarborough |
| 5,584,991 A | 12/1996 | Wittstock et al. |
| 5,593,574 A | 1/1997 | VanToever |
| 5,618,428 A | 4/1997 | Oslund |
| 5,672,271 A | 9/1997 | Dye |
| 5,759,388 A * | 6/1998 | Cote |
| 5,833,845 A | 11/1998 | Anderson |
| 5,935,450 A | 8/1999 | Benedict |
| 5,948,245 A | 9/1999 | Hodak |
| 6,027,641 A | 2/2000 | Spradbury et al. |
| 6,048,453 A | 4/2000 | King, Jr. |
| 6,054,045 A | 4/2000 | Wittstock et al. |
| 6,071,403 A | 6/2000 | Usher |

* cited by examiner

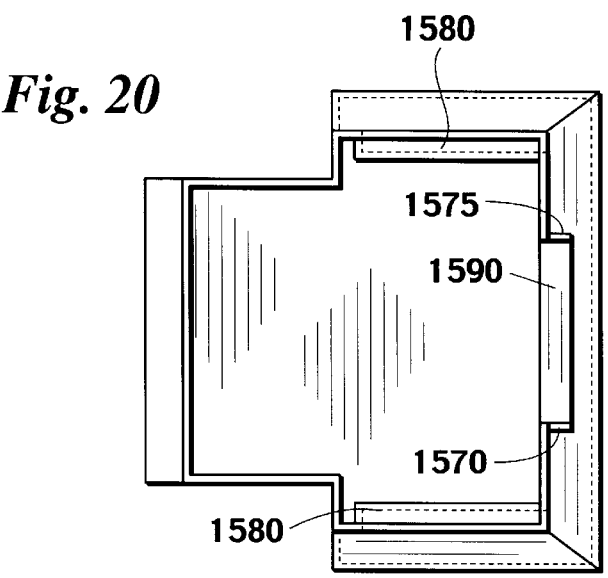
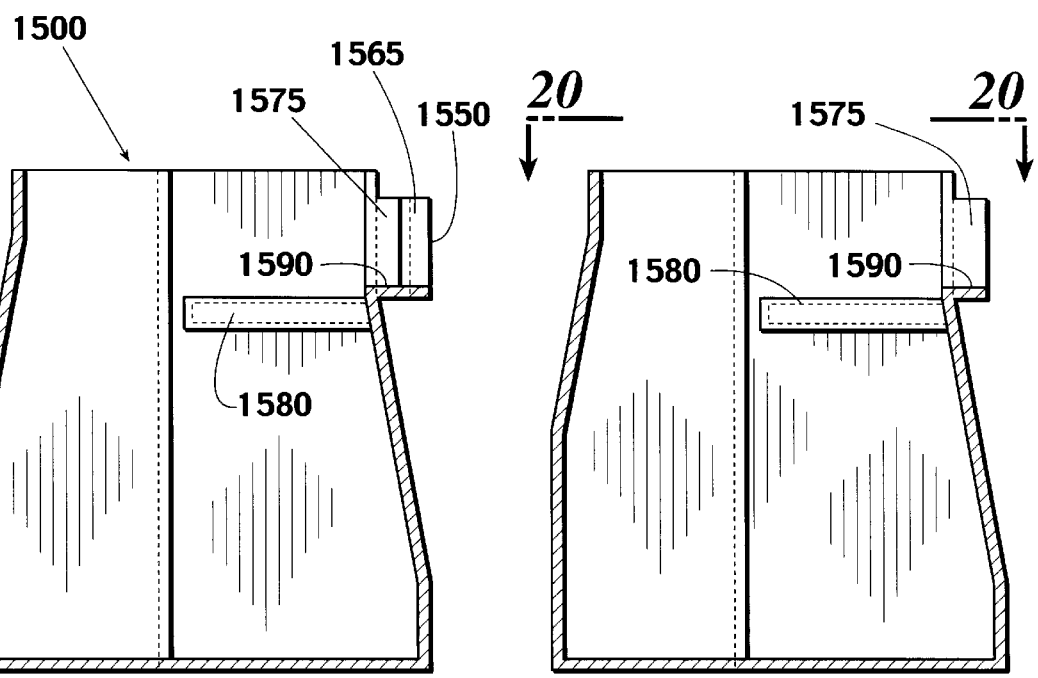
Fig. 20
Fig. 18
Fig. 19

ORNAMENTAL POND SKIMMER AND FILTER APPARATUS

The present invention relates to the general subject matter of maintaining artificial aquatic systems and, more particularly, to methods and apparatus for skimming and filtering or purifying the water in an aquatic life support system such as an ornamental pond.

BACKGROUND OF THE INVENTION

Ornamental pools, ponds, and similar water-filled structures are familiar fixtures in many homes and businesses. These bodies of water provide a pleasant environment for the occupants of the adjacent structure and, in some cases, create habitats for birds, small mammals, and various reptiles and amphibians. However, because these bodies of water are closed systems, some mechanism must be established to keep the water that is contained therein from becoming fouled and stagnant.

One such apparatus that is frequently found used in connection with captive pools is a an in-ground skimmer. Broadly speaking, a skimmer is designed to draw surface water from an adjacent body of water into its interior where it can be filtered to remove its larger debris before that same water is returned to the source from which it was drawn or to a down-stream filter as discussed hereinafter. The filtering function of the skimmer typically takes the form of passing the indrawn water through a coarse net or basket to catch the largest pool contaminants, such as leaves, twigs, and the like. It is customary to use a submersible pump to draw water into the skimmer.

It is well known to those of ordinary skill in the art that skimmers of the sort that are typically used in an ornamental ponds are designed to be installed outside of the pond perimeter. In a typical arrangement, an externally situated skimmer will be buried in the ground adjacent to the pond with the skimmer mouth at the same level as the expected water level. The word "expected" was used in the previous sentence in order to emphasize the fact that the water level in these sorts of ponds is usually not static and might fluctuate up and down for any number of reasons, among which are draught, evaporation, rainfall, leaks (in the pool liner or equipment), and many other factors. Therein lies a problem with conventional skimmer/pond arrangement. When the water level falls below the level of the mouth of the skimmer, the submersible pump therein will continue to pump water out of the enclosure with no concomitant replacement by in-flowing liquid. This has two obvious deleterious effects.

First, absent a continuous source of pond water the pump may empty the skimmer interior, thereby exhausting its source of fluid which can cause the pump to cavitate, which can possibly damage the pump. In such a circumstance—and assuming that operating the pump in the absence of fluid has not damaged it to the point of inoperability—it may be necessary to prime the pump before it can be made operable again, which is, at minimum, an inconvenience.

A second problem that may be faced when the water level drops is that the skimmer enclosure after being emptied of water tends to float upward out of the ground. Those skilled in the art will recognize that the shape of prior art skimmers is at least partially responsible for this problem, as the conventional skimmer is a bucket-like or box-like structure made of plastic and is typically tapered inwardly toward its base, which shape is a convenience for purposes of manufacture, transportation, and storage. As might be expected, a generally smooth outer surface coupled with an inwardly tapered lower terminus tends to make conventional skimmers susceptible to floating when they are emptied of water.

The conventional arrangement, i.e., one where the skimmer is placed outside of the pool, gives rise to additional problems. For example, it is customary to line artificial ponds with a thin plastic or rubber pond liner to separate the impounded water from the earth beneath, thereby improving water clarity and decreasing water loss through the contact with the ground. Of course, this liner must somehow be brought up to the mouth of the skimmer and sealed thereto. As is well known to those of ordinary skill in the art, this seal between the liner and the skimmer is subject to failure through poor installation, subsequent failure of the sealing adhesive due to exposure to sunlight or weather extremes, movement of the skimmer within its cavity in the ground, and many other possible factors As a consequence, water leaks through an imperfect seal between the skimmer and the pond liner are a frequent source of water loss and resultant aggravation to the owner.

Additionally, in larger pools it is often desirable to include a bottom drain of some sort, a bottom drain being a draining orifice that is preferably positioned near the deepest point of the pool. A bottom drain is useful for many purposes including draining the pool and cleaning. Of course, this drain must penetrate the pond liner which can become problematic if it begins to leak.

Finally, one of the principle functions of the skimmer is to remove large debris such as leaves from the surface of the pond water. However, matter of this sort is prone to cover the available filtering surface within the skimmer, thereby retarding the passage of water therethrough. A typical skimmer utilizes a catch basin in the form of a net that hangs or is positioned on a lip or ledge of the skimmer mouth as an initial filtering mechanism. However, nets can be difficult to remove and clean and, because of their lack of rigidity, are prone to becoming tangled or twisted. Of course, when debris clog the net water will somehow find a path that avoids the net/clogs and will carry contaminants along with it into the filtering media and submersible pump. Further, nylon nets, which are conventionally used as filters, can be difficult to clean as debris tend to catch in its fibers.

Another device that is frequently used in an ornamental pond setting is the water filter (which may be configured in the form of a small waterfall in some circumstances). The pond filter takes water from the pond and subjects it to a filtering process before returning it to the pond from whence the water was drawn. Preferably, the filter will be outfitted with filtering media (such as lava rocks, coarse nylon mesh filter mats, etc.) and water will be passed through the filtering media before it is returned to the pond. Additionally, the filter may be adapted to return water to the pond in the form of a waterfall, which waterfall has both aesthetic as well as functional (e.g., aerating the pond water) value.

However, these sorts of filters are subject to a number of problems. First, these devices have heretofore not provided sufficient sedimentation opportunities for the pond water. That is, water that is drawn into the filter will usually contain a variety of heavier waste particles (e.g., fish waste, uneaten fish food, leaves, etc.) that tend to clog the filter media when they are entrapped thereby, which necessitates cleaning the media earlier than might otherwise be desired. Each time such a filter is cleaned, however, the bio-activity that is taking place within the media is placed at risk. However, if a proper sedimentation environment were present within the filter, i.e., if the flow of water therethrough were slowed to the point where these sorts of heavier waste particles were allowed to settle to the bottom of the filter before the water reached the filtering media, the filtering media would need to be cleaned less often.

Finally, the problems associated with integrating the waterfall/filter with the body of water are well known. For example, since the filter conventionally sits outside of the pond it must somehow be attached to the pond liner in a way such that water is not leaked around the periphery of the liner. Conventionally, the pond liner is brought up to and attached to the filter beneath its "snout" through some combination of adhesives and mechanical fasteners, including screws, bolts, etc, which mechanical fasteners are usually designed to pierce the liner. However, that arrangement is almost universally subject to leaks for a variety of reasons that are well known to those of ordinary skill in the art.

Heretofore, as is well known in the ornamental ponds arts, there has been a need for an invention to address and solve the above-described problems. Accordingly, it should now be recognized, as was recognized by the present inventor, that there exists, and has existed for some time, a very real need for a device that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

There is provided hereinafter a new skimmer apparatus and a new filter mechanism for use in ornamental ponds and the like. According to a first preferred embodiment there is provided a skimmer apparatus which has an enclosing container with a lower terminus that has a perimeter which is larger than that of the upper terminus. In more particular, the instant in-ground skimmer apparatus is dimensioned contrary to the conventional wisdom in that it has a base that is outwardly flared. This design makes it possible to "wedge" the skimmer down into the earth or pool, and substantially reduces or eliminates the risk that the skimmer will float upward if it is emptied of water.

According to another preferred aspect of the instant invention, there is a provided a skimmer which is suitable for placement within the pond itself. The preferred embodiment has at least one aperture or passage through the lower portion of its body, which aperture allows water from deeper in the pool to directly enter the skimmer body. This innovation improves circulation of water near the bottom of the pond, thereby improving temperature consistency and aeration throughout that body of water.

According to a further aspect of the instant invention, there is provided a skimmer which contains an internal partition, wherein the partition contains apertures only at its bottom. That is, the instant partition bifurcates the interior of the skimmer in to two regions: one which contains a submersible pump and the other which contains a basket/strainer. However, the partition that bifurcates the interior of the skimmer has a plurality of apertures only at its lower end, which causes water that is pulled into the skimmer by the pump to be drawn downward and through the straining basket (or net, etc.) in such a way that the basket is less likely to be completely blocked by the debris that inevitably accumulate therein.

According to still another preferred aspect of the instant invention, there is provided a filter which includes a unique mechanical method of affixing the pond liner to it. In more particular, the instant preferred embodiment includes a spline and grove combination to firmly attach a pond liner to the snout or outsource of the filter under its snout.

According to still a further preferred aspect of the instant invention, there is provided a pond filter which contains a true sedimentation chamber within the bottom portion thereof. That is, in a preferred embodiment water is brought into the bottom of the filter and released therein in a matter that creates a minimum of turbulence, thereby promoting the settling of heavier matter in the water to the bottom of the filter. Additionally, this embodiment will additionally contain a backwash port for removal of water from the bottom of the filter.

According to still another preferred embodiment, there is provided a skimmer apparatus with a snout that is adjustable as to width. That is, the preferred embodiment of the instant skimmer has a snout which can effectively widened by removing a portion of its terminus.

The foregoing has outlined in broad terms the more important features of the invention disclosed herein so that the detailed description that follows may be more clearly understood, and so that the contribution of the instant inventor to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

FIG. 18 contains a cross sectional view of a preferred skimmer embodiment, wherein the snout is at its maximum length.

FIG. 19 illustrates the embodiment of FIG. 18, wherein the snout has been shortened, thereby effectively widening it.

FIG. 20 is a top view of the embodiment of FIG. 19.

DETAILED DESCRIPTION OF THE PREFERRED EMBODIMENTS

Figure 1:
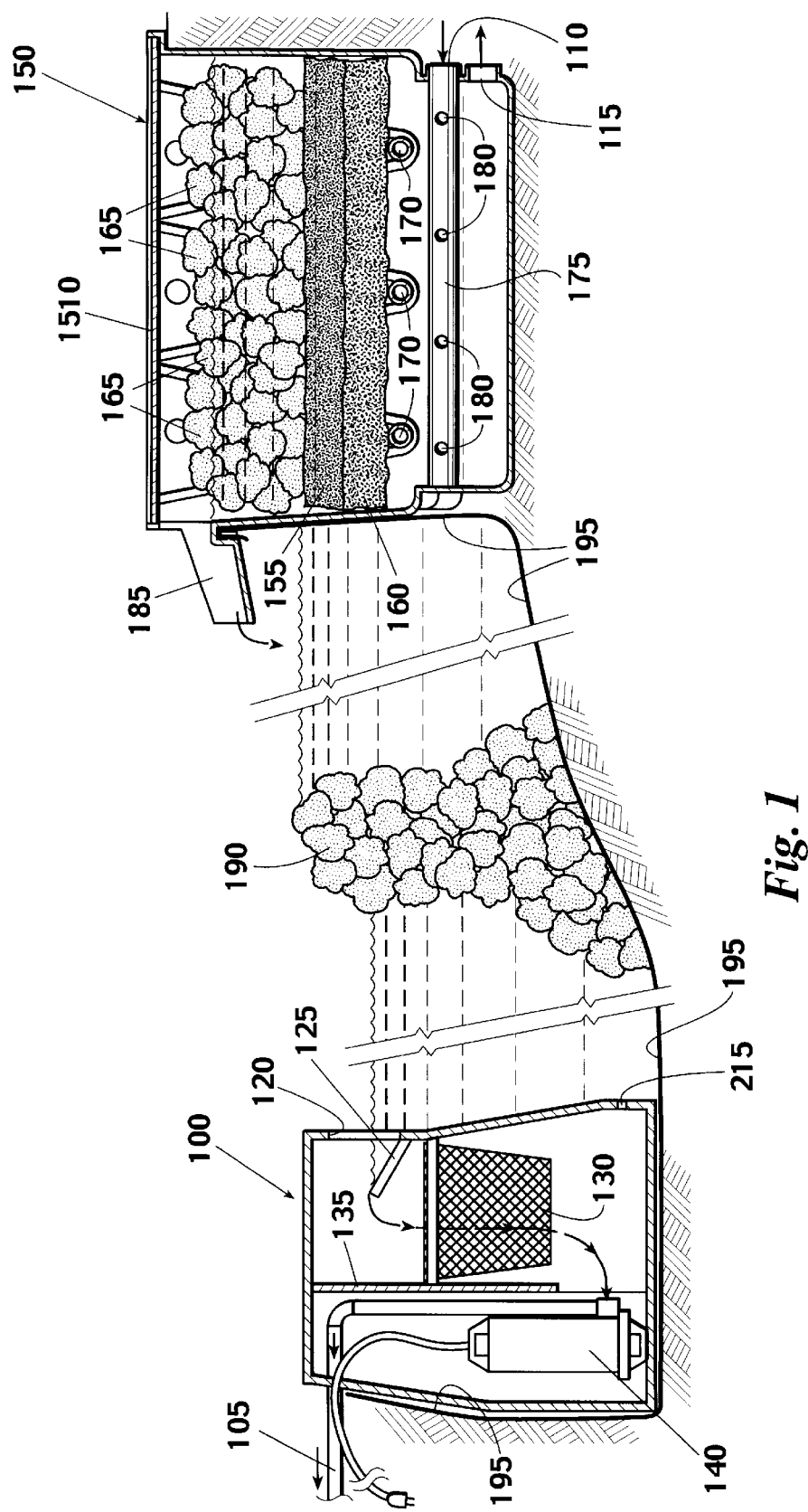
FIG. 1 contains a schematic illustration of the general enviromnent of the instant invention.
Figure 3:
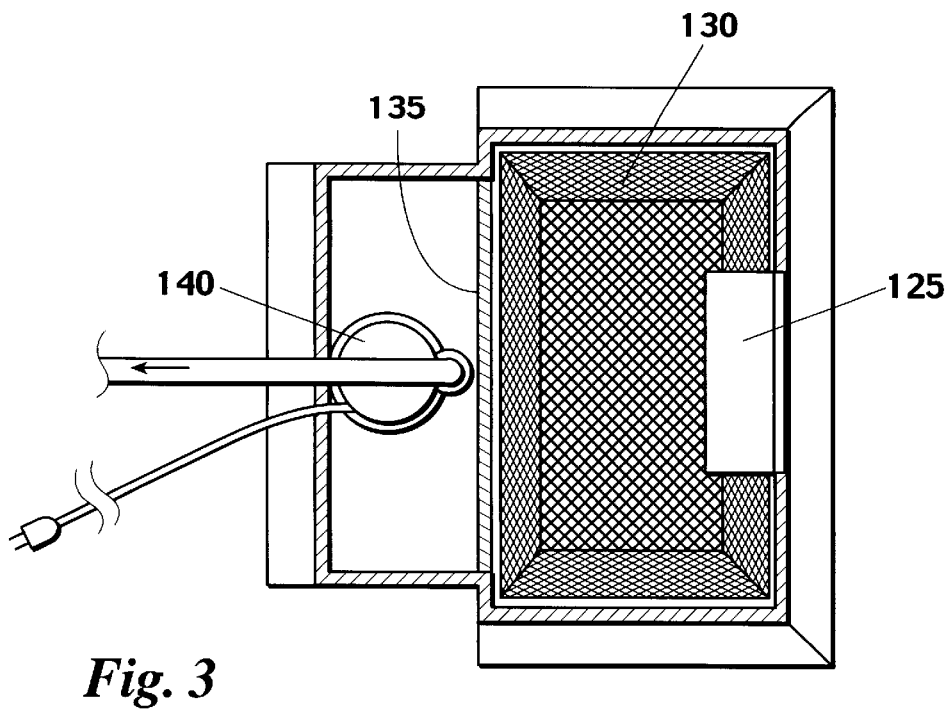
FIG. 3 contains a top view of the skimmer embodiment of FIG. 2.

Turning first to FIG. 1, wherein the general environment of two preferred embodiments of the instant invention is illustrated, in the preferred embodiment the instant skimmer 100 and/or filter 150 will be installed proximate to a body of water, such as an ornamental pond. Preferably the system of the instant invention will utilize both the skimmer 100 and filter 150, although that is not strictly required and each may be utilized separately. Speaking in general terms, in the preferred arrangement, the skimmer 100 will draw water through mouth 120, over weir 125, down and through basket 130, past partition 135 and into pump 140. The water that is drawn into submersible pump 140 is then forced out through pressure line 105 which preferably is in hydraulic communication with filter intake 110, i.e., water drawn from the pool by the skimmer 100 is returned via line 105 to the input 110 of the filter 150.

Water coming into filter 150 arrives in its lower portion where it is distributed internally via diffusing line 175), which contains a plurality of laterally positioned holes 180 placed therein. Preferably, and as is discussed in greater detail below, the water discharge apertures 180 will be oriented horizontally, so as to not introduce currents in the bottom portion of the filter 150 (i.e., the "sedimentation chamber") that would tend to disturb the particles that have settled out. Of course, the pressure of incoming water that arrives through intake 110 will force water upward and past media support members 170, through various mat filters 155 and 160, past lava rocks 165 (or similar coarse and porous media), out of the snout 185 and back into the body of water from which the filtered water was originally drawn. In many instances, the returning water will be made to serve some ornamental purposes (such as forming a water fall, etc.). Further, and this is especially true of ornamental ponds, there might be a plurality of different water levels in the pond (e.g., in FIG. 1 the central rock mass 190 separates the pond into two such levels) which might be connected by an artificially created waterfall, etc.

Turning now to FIGS. 2 through 5, wherein a preferred embodiment of the skimmer of the instant invention is illustrated, the preferred skimmer 100 incorporates a number of unique features therein. First, it should be generally noted at the outset that, unlike the prior art, the preferred skimmer 100 embodiment is designed to sit inside of the pond liner 195. Among the innovations that make this possible include the outwardly flaring base 210 of the skimmer enclosure 205 and the weep hole 215 in the base of the skimmer which is designed to be in fluid communication with the water in the pond as is described hereinafter.

Figure 5:
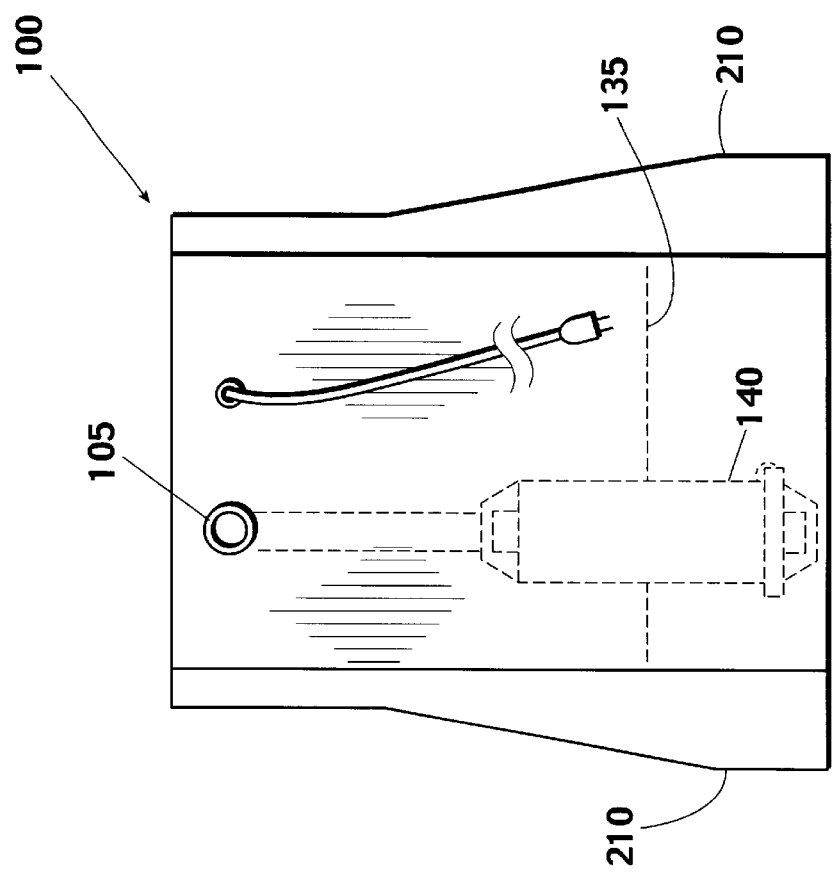
FIG. 5 contains a rear view of the embodiment of FIG. 2.
Figure 4:
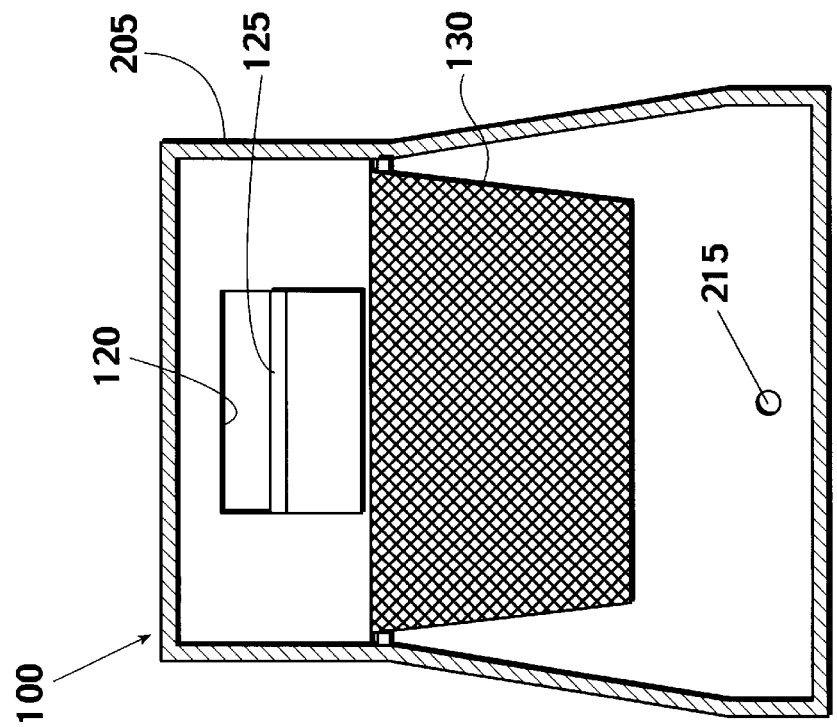
FIG. 4 contains a front view of a embodiment of FIG. 2.

Of particular importance to the instant invention is the outwardly flaring base 210 which makes the instant skimmer 100 reliably positionable inside of the pool liner 195 and, hence, within the pond itself (FIGS. 4 and 5). This is most clearly illustrated in FIG. 1, wherein the pool liner 195 is seen to pass behind and include the preferred skimmer enclosure 205. A first unique feature of the instant skimmer 100 that makes its placement within the pond itself feasible is that the perimeter of the its base is larger than that the perimeter of its upper portion. As a consequence, it is possible to pile stones or other weights against the base, thereby holding it firmly in place. This importance of this feature will become apparent if, for example, the interior of the skimmer 100 were to be pumped partially or completely dry. That is, if the water level of the pool drops below the skimmer opening 120, the pump 140 will continue to operate and eventually eject all of the water inside of the skimmer enclosure 205. However, in prior art skimmers—which are invariably tapered toward their base to make them easier to manufacture and store—if the skimmer were to be placed inside of the pond and thereafter pumped dry, the water in the pool would float the skimmer up and out of its secure niche. As might be expected, this will have adverse consequences on the piping, seals, etc., that connect the skimmer to the rest of the pool equipment. However, the instant invention 100, because of the innovative shape of its base, can be placed inside the pool itself and weighted down/locked in place within the water by rocks, sand, etc., which would usually be piled up against its base.

Another innovation that allows the instant skimmer to be placed inside of the pool liner 195 and within the water is the addition of weep hole 215, which is best illustrated in FIG. 4. The function of weep hole 215 is to allow at least a trickle of water to enter the skimmer 100 at its base even if the water level should happen to fall below the skimmer opening 120. Provided that the skimmer face containing the weep hole 215 is kept in contact with the pond water—and provided that the water level does not sink below the weep hole 215—a continuous supply of water will be fed to the pump 140, thereby helping to prevent the damage that would be expected to occur if it were to operate without water. Further, since weep hole 215 draws water from deep in the pool, it would normally not be expected to contain many large debris of the sort that the basket 130 is designed to remove. Finally, the weep hole 215 allows water to be drawn from the deeper water within the pool, thereby promoting a more even temperature and enhanced aeration throughout the pool water. Naturally, the size/diameter and location of the hole 215 can be varied to suit the needs of each situation and it is within the ability of one skilled in the art to do so.

Figure 2:
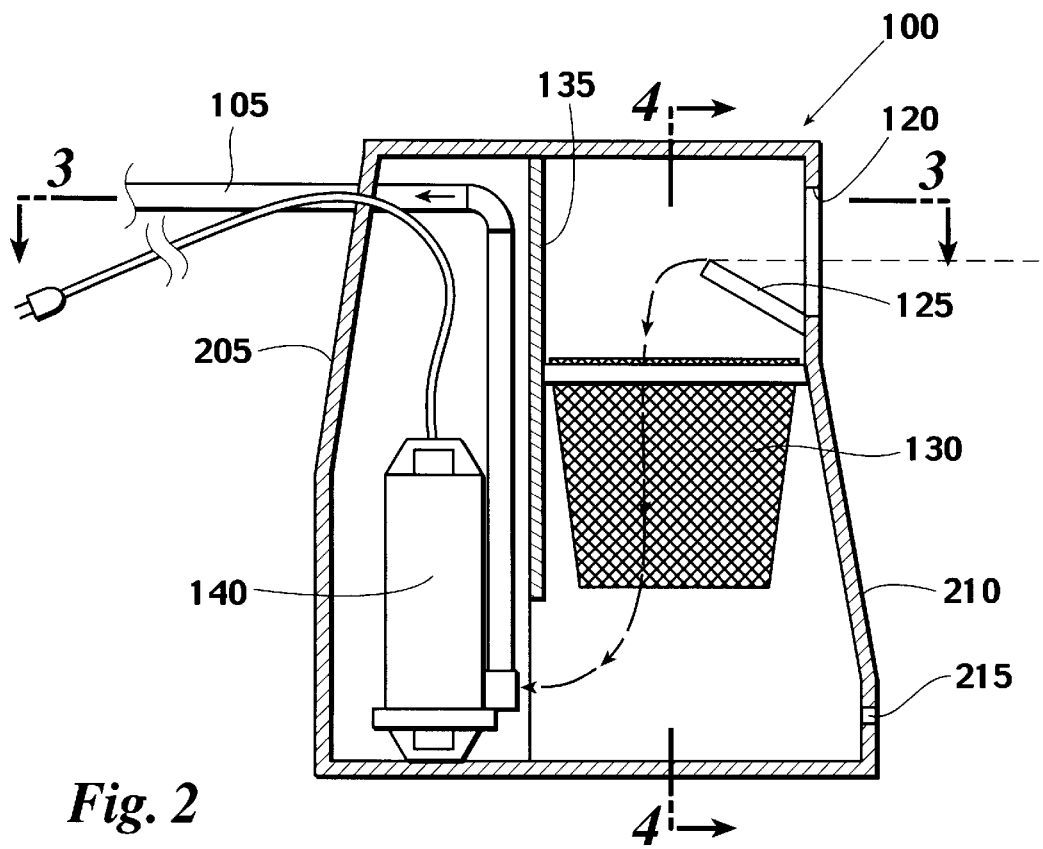
FIG. 2 illustrates the general configuration of a preferred skimmer embodiment.

Turing now to another preferred aspect of the instant invention, as is generally illustrated in FIG. 2, preferably the skimmer 100 will be equipped with a central partition 135 which divides the interior of the skimmer 100 into two different regions: one of which contains the skimmer opening 120 and the other which houses the submersible pump 140. However, according to the preferred embodiment, this central partition will only allow water to pass into the pump 140 through its lower half, which might be equipped with a number of apertures therethrough, or, alternatively, the partition 135 might be stopped short of the bottom of the skimmer enclosure 205. Either way, the reason for selecting this configuration is that it forces the water that is drawn into the skimmer 100 through skimmer opening 120 to pass through the basket 130 before it arrives at the pump 140. As is well known to those of ordinary skill in the art, in the conventional arrangement water from the pond into the skimmer and over and through a basket which is designed to catch the largest of the floating debris. However, as the basket of a conventional skimmer fills with debris—and this is especially true with when the debris contains large leaves—its effectiveness decreases due to blockage of the water path ways therethrough and, in many instances, the water drawn into the skimmer begins to travel over and around the filtering basket, thereby reducing its effectiveness.

In the preferred embodiment of the instant invention 100, the basket 130 is made of a rigid material such as plastic and is tapered toward its lower extremity so that there is space between the walls of the basket 130 and the inside of the skimmer enclosure 205. The advantage of the tapering is, as is best illustrated in FIG. 2, that as the bottom of the of the basket 130 fills with debris, water will then tend to flow into the basket 130 and out through its sides, thereby allowing the basket 130 to accumulate additional debris before it is necessary to empty it. Additionally, it is preferable that the mouth of the basket 130 completely fill the upper portion of the skimmer enclosure 205 (FIGS. 3 and 4), so that when the basket 130 becomes blocked water will not easily be able to find a way around it.

Figure 7:
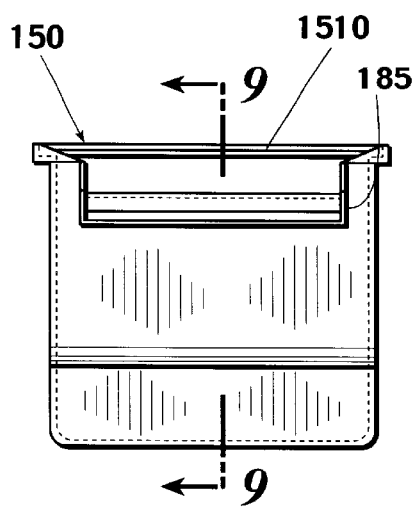
FIG. 7 illustrates a front view of the filter embodiment of FIG. 6.
Figure 6:
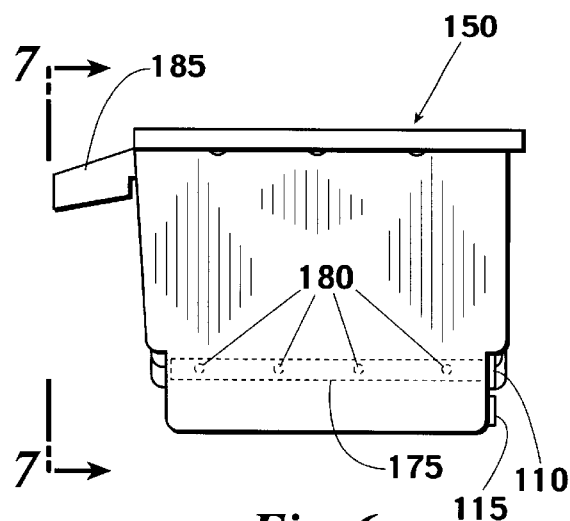
FIG. 6 contains a side exterior view of a preferred filter embodiment.
Figure 8:
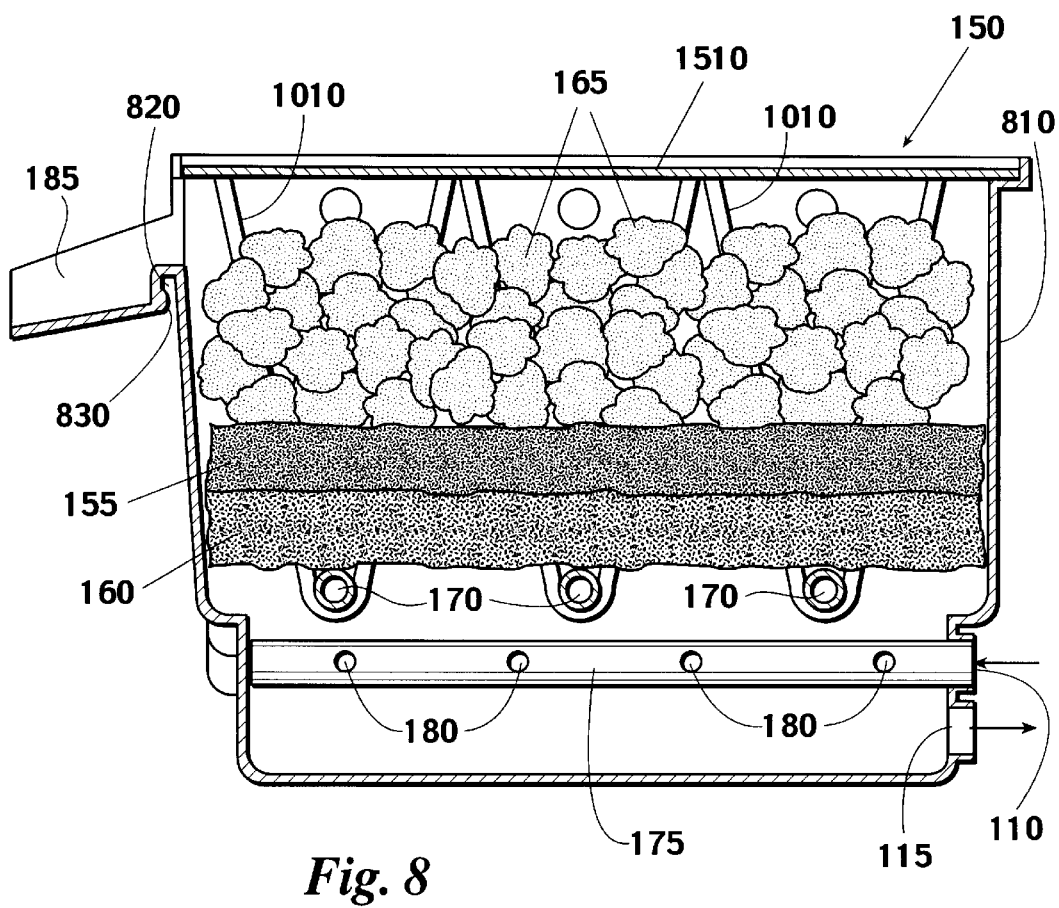
FIG. 8 contains cross sectional view of the filter embodiment of FIG. 6.
Figure 9:
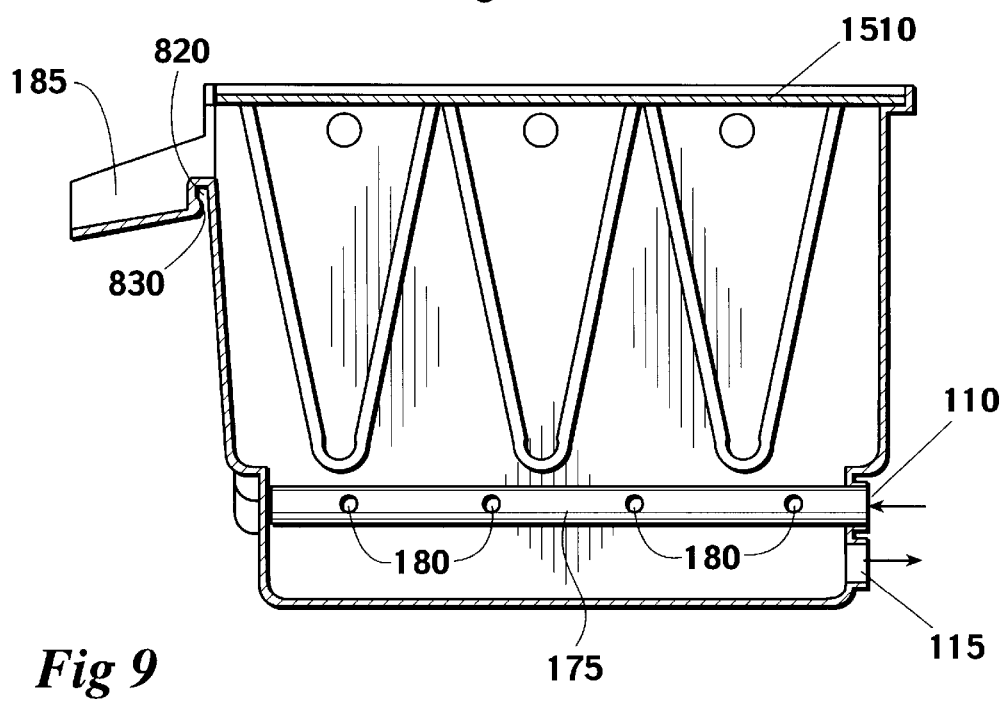
FIG. 9 illustrates a cross sectional view of the embodiment of FIG. 8.

Turning next to a discussion of the preferred filter 150 embodiments, there are illustrated in FIGS. 7 through 9 various preferred aspects of that device. According to a first preferred embodiment, there is provided a filtering mechanism 150 for use in connection with a pool of water that utilizes conventional media filters in concert with a sedimentation chamber to trap particulate matter therein. As is illustrated in FIG. 8, the preferred filter embodiment 150 takes the form of a container 810 which is preferably made of water impermeable material such as plastic. Conventionally, and is generally indicated in FIG. 1, such a filter 150 would normally be at least partially buried in the earth at the edge of the pond outside of the pond liner 195.

Inside of the filter 150 are preferably one or more filter pads 155 and 160, which are mats of coarse filtering media designed to remove debris from the water. The filter pads 155 and 160 are preferably supported above the bottom of the filter 150 by lateral support members 170, which preferably take the form of plastic tubes that are oriented transversely to the longer axis of the filter container 810, the purpose of the support members 170 being to support the filter media to a height sufficient to create a sedimentation chamber in the lower portion of the filter 150 and to strengthen the walls of the container 810 to help the filter container 810 resist the force of the earth against the buried walls. Additionally, in the preferred embodiment the support member 170 will be supported within the filter 150 at the lower terminus of V-shaped ridges 1010, which can be most clearly seen in FIGS. 10 and 11. Finally, in the preferred embodiment the filter pads will be covered with lava rocks 165 or a similar material, which provides a porous surface on which beneficial organisms such as bacteria can find purchase and grow.

The purpose of the sedimentation chamber mentioned previously is to trap some portion of the particulate matter entering the filter 150 before that matter encounters the filter media 155 through 165. There are many reasons that this might be done, but among the foremost is that particulate matter (such as fish waste, uneaten fish food, leaves, etc.) tends to block the passage of water through the filtering media. Eventually, the accumulated debris will reduce the efficiency of the filtering media by blocking the narrow passageways inside of the filter pads 155 and 160 to the point where they will need to be cleaned. The cleaning process, though, can damage the organisms that grow on the media and which are responsible for bioactive filtering of the pond water. Thus, it is advantageous to the health of the pond to only clean the filtering media when it is truly necessary and anything that delays the necessity for that operation will generally result in improved pond and filtering operations.

As is best seen in FIG. 8, in the preferred embodiment a pressurized water source (preferably from pump 140) is brought into the filter through intake orifice 110. However, rather than simply spewing the pressurized water into the interior of the filter 150, the instant inventor prefers instead that the water be gently disbursed throughout its interior via diffusing line 175, which line 175 has a plurality of apertures 180 placed along its length. The purpose of the apertures 180 is to regulate the distribution of water within the bottom portion of the filter 150 and release the water internally so as to create as few currents and eddies as possible. As is generally illustrated in FIG. 8, the apertures 180 are preferably oriented to cause the incoming water to be released in a lateral/horizontal direction. This will have the effect of not disturbing the contents of the bottom portion of the filter 150—the sedimentation chamber—as little as is possible. Of course, this will have the consequence of improving the efficiency of the sedimentation chamber at the base of the filter 150. As is well known to those of ordinary skill in the art, to the extent that the water in the base of the filter 150 is relatively motionless, particles in the water will be more likely to drift downward and, thus, away from the filtering media (e.g., porous mat filters 155 and 160, and lava rocks 165) which preferably occupy the upper portion of the filter 150. Trapping as many of the larger debris as is possible in the bottom of the filter 150 has a number of clear advantages, not the least of which is a reduction in the need to clean the filter media within the filter 150.

According to another preferred embodiment there is provided a pond filter substantially as described above, but further containing a backwash orifice 115 in its lower portion. As has been described previously, in the preferred embodiment the lower portion of the filter 150 will act as a sedimentation chamber for removal of larger debris from the water. That, of course, means that periodically the debris that have settled out from the water need to be removed from the bottom of the filter 150. Heretofore, there has not been a convenient way to do this. However, the instant embodiment of the filter 150 preferably includes a backwash orifice 115 which is used to draw water from the bottom of the filter 150. When water is withdrawn from the filter 150 via this orifice, the rush of withdrawn water will carry debris along with it that have previously been deposited within the sedimentation chamber. Thus, the sedimentation chamber may be separately cleaned without disturbing the filter media that is found above it in the filter 150.

Because filters of the general sort described herein are designed to sit outside of the pond (i.e., beyond the extent of the pond liner 195), creating a water tight connection between the filter and the pond is a universal concern. As has been described previously, leaks in the system can cause fluctuations in water level that can adversely impact both the biological and mechanical systems of the pool.

Heretofore, it has been customary to attach the pond liner 195 to the filter 150 through some combination of adhesives and mechanical fasteners (e.g., screws, bolts, etc.) that pierce the liner. Needless to say, any breach in the integrity of the liner is an invitation to leak.

In a typical arrangement, the filter will return the filtered water to the pond in some aesthetically pleasing manner, such as via a waterfall. For example, in FIG. 1 the filter 150 returns the now-cleaned water to the pond by allowing it to flow upward, outward and through snout 185, the terminus of which is preferably positioned to be above the level of the water in the pond, thereby creating a waterfall effect. In prior art filters, the filter snout is manufactured and shipped as a separate component which is installed on site by bolting it onto the filter container. Of course, those of ordinary skill in the art will recognize that the he point of connection between the snout and the filter container is a ready source of water leaks, even if the greatest care is taken in its installation. Additionally, and as has been previously described, as part of this installation the pond liner is secured between the separate snout and the filter container in a manner that creates numerous holes therein.

However, the instant preferred filter embodiment includes two innovations that reduce the probability that water from the pond will be lost during its trip through the filter 150. As a first innovation, the instant filter is preferably manufactured with a snout 185 that is integral to the filter container 810. As is generally illustrated in FIG. 8, in the preferred embodiment the snout 185 and filter 150 will be molded in a single piece, thus eliminating the joining surface as a potential source of leaks.

Additionally, the instant inventor has devised a method of attaching the pond liner 195 to the filter 150 which does not require piercing the liner 195, and which operates to reliably seal the liner 195 to the filter 150 without adhesives. As is best illustrated in FIG. 8, the preferred embodiment of the snout 185 includes a pre-formed locking channel 820 on its underside, preferably beneath the point where the snout 185 and filter container 810 intersect. The channel 820 is sized to accommodate a spline 1100, one preferred embodiment of which is illustrated in FIGS. 11–14. As can best be seen in FIG. 13, the preferred spline 1100 embodiment includes a channel grove 1110 which is preferably sized to mate with a corresponding protrusion 1110 on the underside of a preferred snout embodiment 1310, thereby locking it into position. Although the preferred spline 1100 embodiment is preferably made of a relatively stiff material such as wood or plastic, those skilled in the art will recognize that this configuration is not strictly required and that it is only necessary that the spline 1100 be able to support the pool liner 195 in the manner described hereinafter. Additionally, although the instant spline 1100 is preferably linear other configurations are certainly feasible. It is only required that the spline 1100 be shaped so that it can mate to the corresponding locking channel 820 on the underside of the snout 1310, whatever that shape might be.

Figure 14:
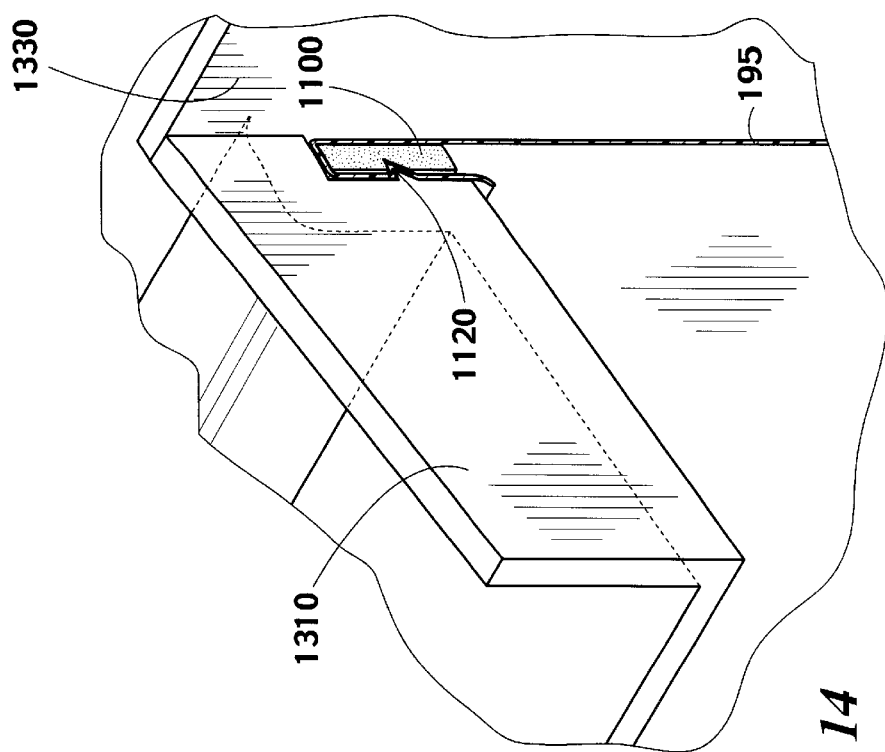
FIG. 14 illustrates how the preferred spline embodiment appears after engagement with the reward channel of a preferred snout.
Figure 13:
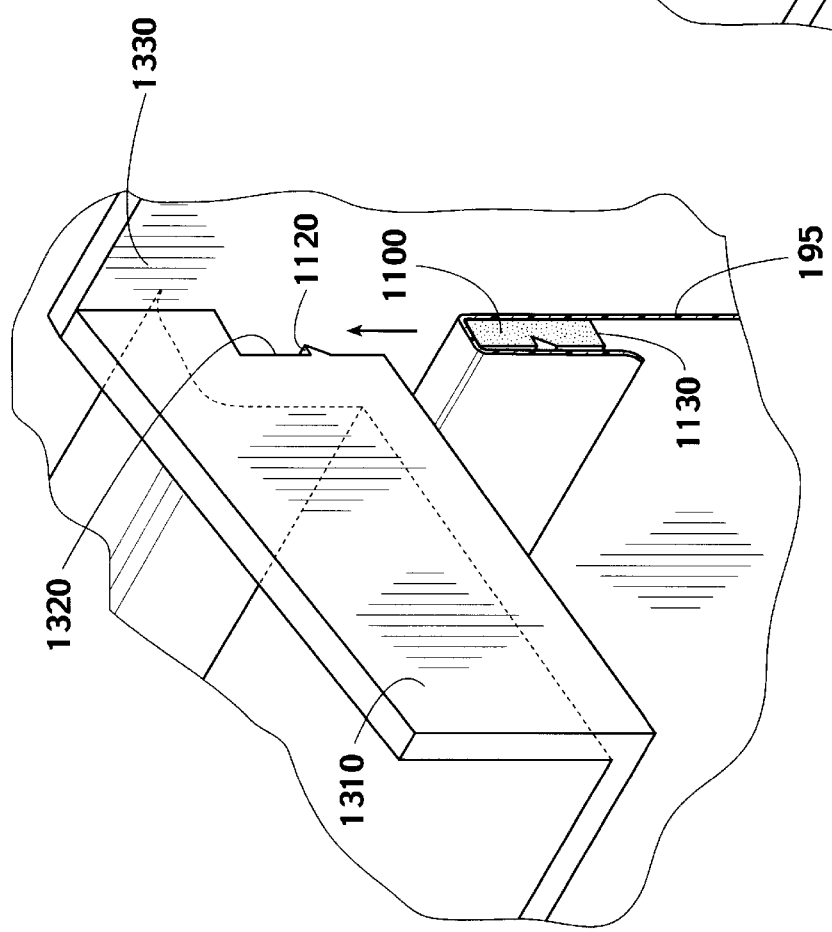
FIG. 13 contains an illustration of how the instant spline is used in combination with a rearward channel of a preferred snout to attach the pond liner to the filter.
Figure 16:
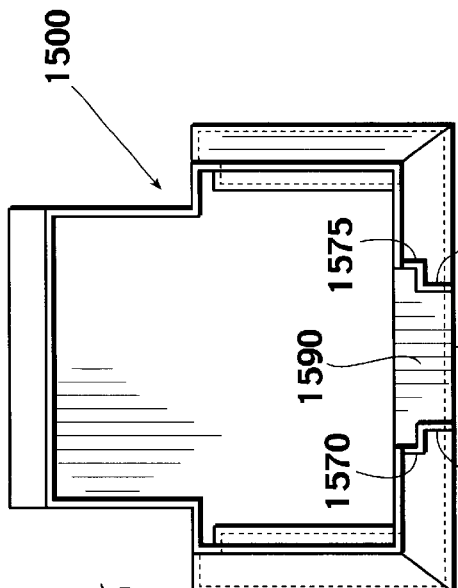
FIG. 16 illustrates a top-view of the preferred adjustable snout embodiment.
Figure 15:
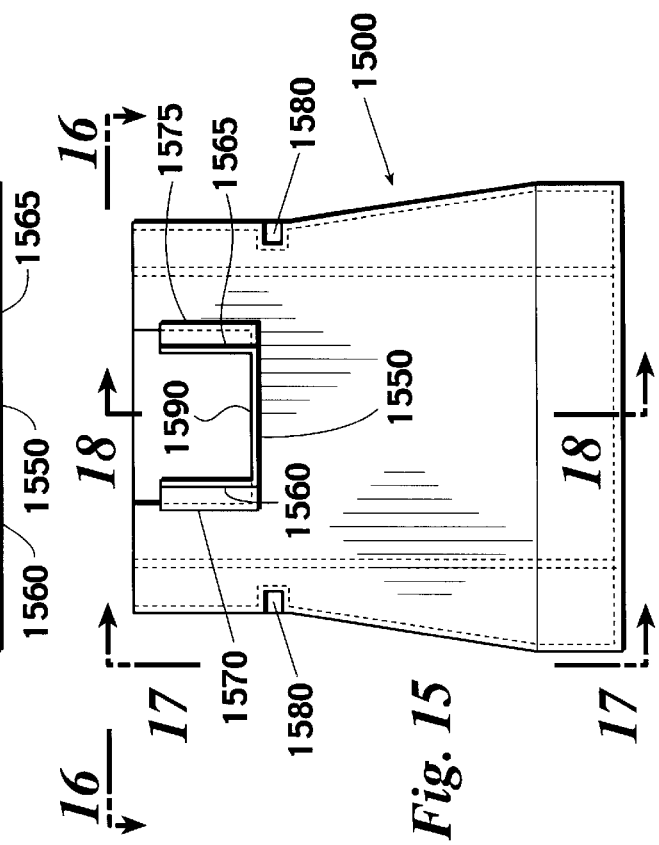
FIG. 15 contains a front view of a preferred adjustable snout skimmer embodiment.
Figure 17:
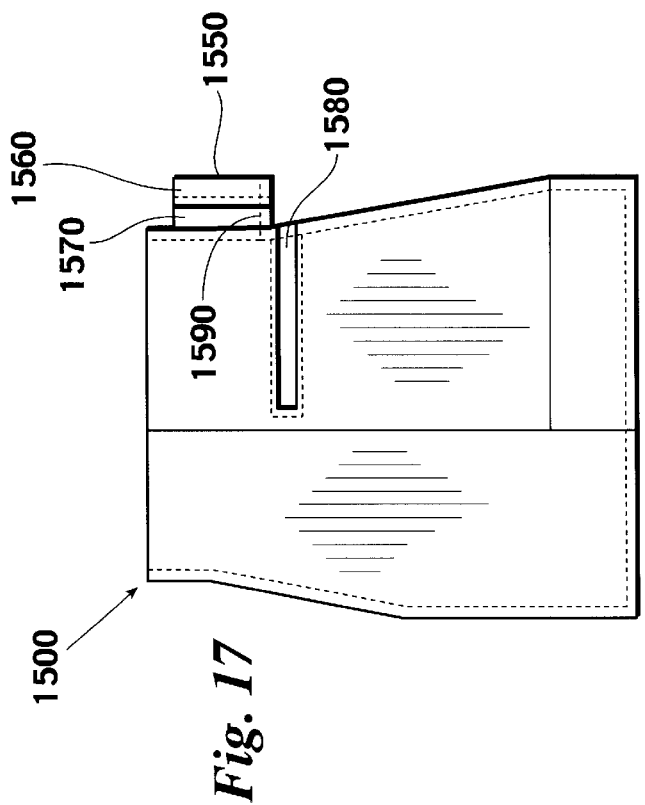
FIG. 17 contains a cross sectional view of the preferred adjustable snout skimmer embodiment.

As is best seen in FIGS. 13 and 14, in the preferred embodiment a portion of the periphery of the pool liner 195 is draped over the spline 1100, before it is inserted up and into a channel 1320 behind the snout 1310. The lower protrusion 1320, which preferable extends the width of snout 1310, is sized to interlock with and hold the spline 1100 in place after its insertion. Additionally, it is preferable, though not absolutely required, that the snout 1310 have some degree of flexibility so that it can be tilted upward during insertion of the spline 1100 into the channel 1320, thereby providing additional spacing between the terminus of the protrusion 1120 and the wall of the filter container 1330.

Figure 10:
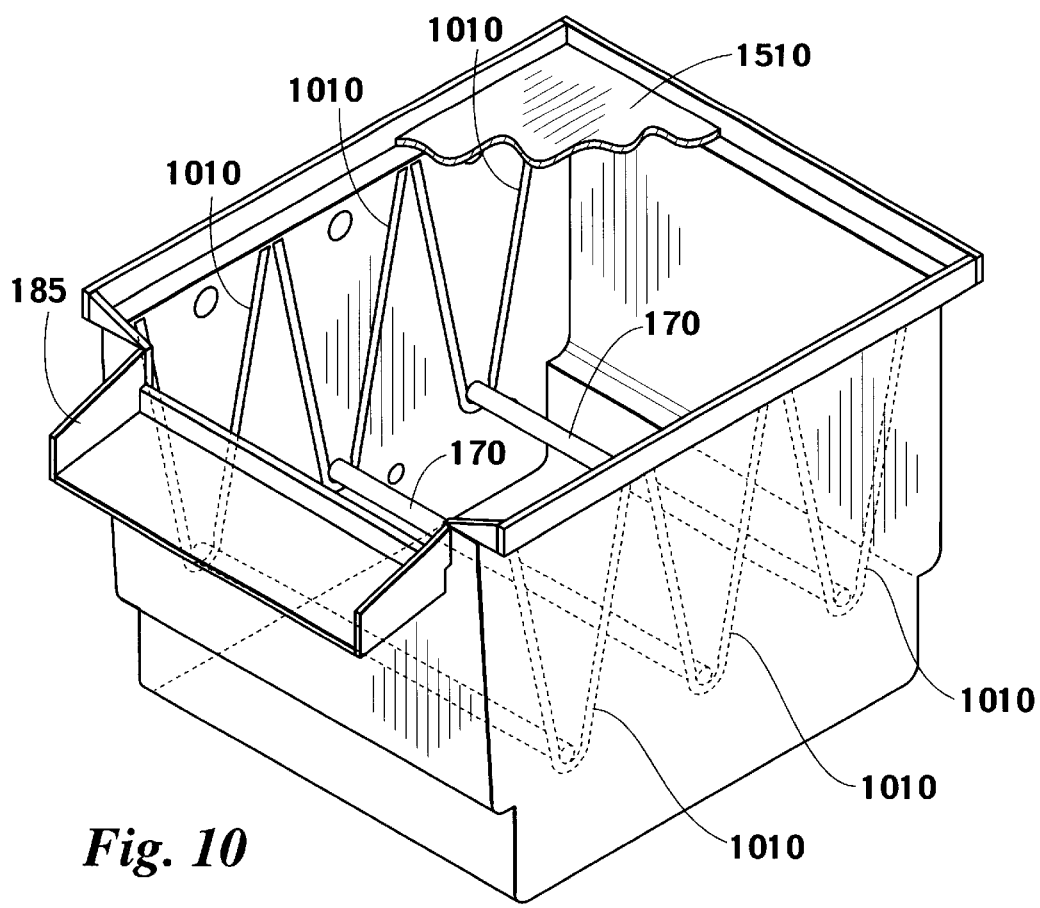
FIG. 10 illustrates a preferred filter embodiment, wherein the cross member support catches are more clearly illustrated.
Figure 11:
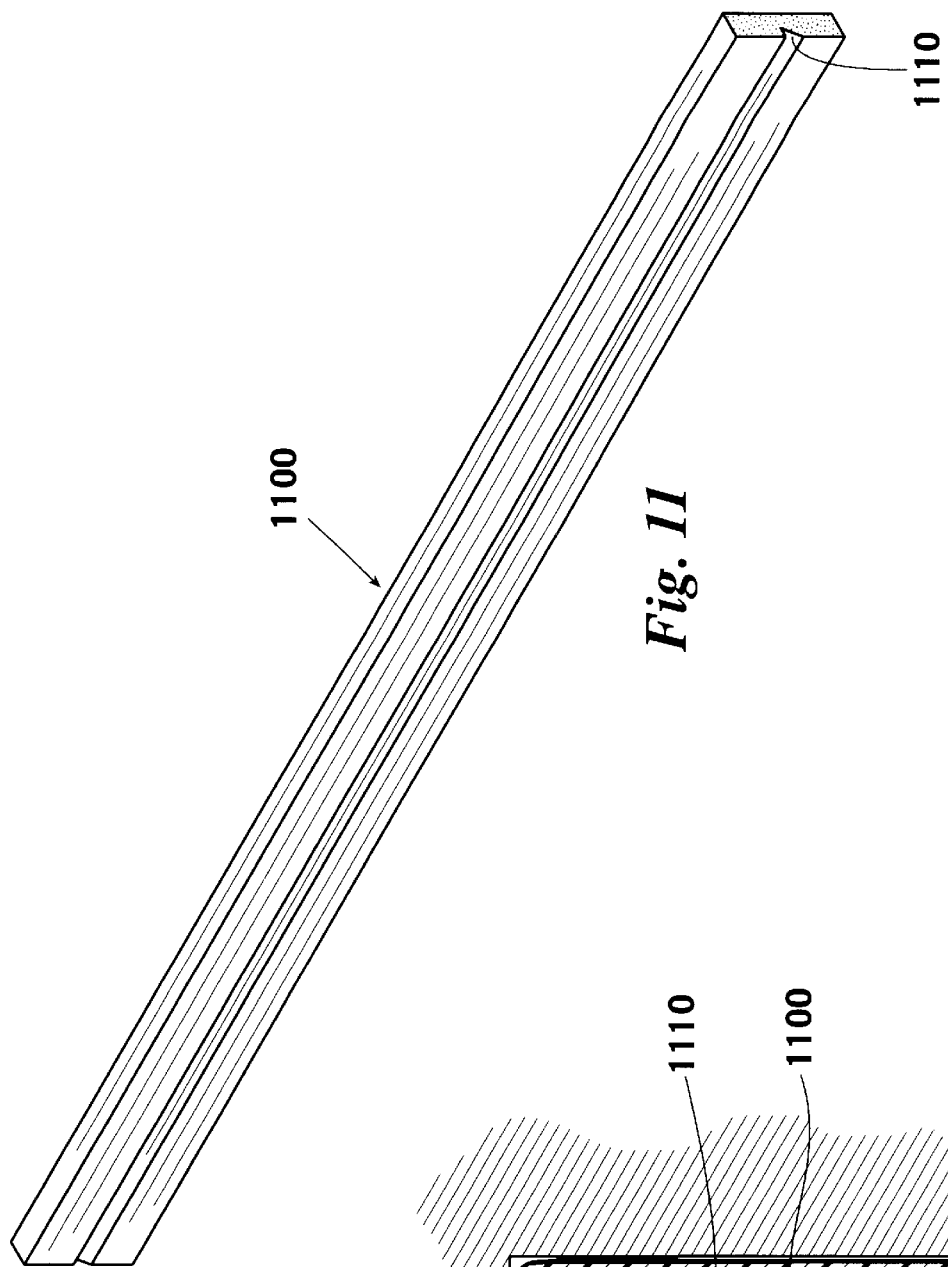
FIG. 11 contains a perspective view of a preferred spline embodiment.
Figure 12:
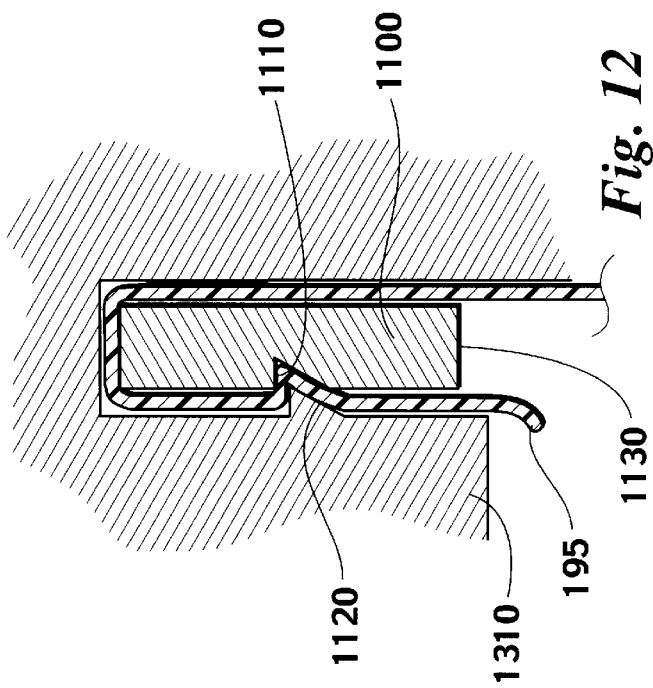
FIG. 12 illustrates a cross sectional view of a preferred spline embodiment.

Additionally, it should further be noted that the filter 150 embodiment of FIGS. 8 through 10 is also specifically designed for use with a liner 195 locking spline 1100 of the sort discussed previously. As can be seen in those figures, rounded protrusion 830 is preferably sized to retain a spline 1100 in place when such spline 1100 is thrust upward and into position above it. In such an instance, the preferred spline 1100 embodiment would rest its lower face 1130 against the protrusion 830, which would then hold the spline 1100 firmly in place until such time as its owner desires to loosen it. Additionally, and as has been discussed previously, it is preferable that snouts 1310 and 185 be somewhat flexibly attached to the body of the filter 150, so that they can be tilted upward at their respective mouths, thereby widening the space into which the spline 1100 is preferably inserted.

Of course, one obvious advantage of this arrangement is that is provides a secure way to attach the pond liner 195 to the filter 150 without introducing potential leaks into the liner 195 by piercing it with screws and bolts. Additionally, the instant embodiment does not require the use of adhesives which almost inevitably fail over time. Finally, the instant preferred embodiment further helps to prevent leaks in the pond by shielding the liner 195/filter 195 joining region from direct contact with the pool water, thereby eliminating that traditional source of water loss.

According to still another preferred aspect of the instant invention, and as is best illustrated in FIGS. 7 through 10, there is provided a lid 1510 which is designed to be used in combination with a preferred configuration of the filter container 810 to further reduce the likelihood that water will escape from the instant skimmer/filter system. By way of explanation, as is well known to those of ordinary skill in the art conventional filter lids are sized to be larger than the opening that they cover. That is, the periphery of a conventional filter lid will extend beyond the upper edge of the filter in the same way that a standard trash can lid covers a trash can opening. This configuration has the undesirable consequence, in the case of a filter cover, of allowing water to escape from the system when it collects on the underside of the lid and travels to the outer perimeter of the lid, thereafter falling to the ground outside of the filter. Of course, there are several mechanisms that might cause water to accumulate on the underside of the filter cover including condensation, spray from water splashes inside of the filter, etc. However, the instant inventor has invented a lid configuration that virtually eliminates this problem. In more particular, the instant lid 1510/container 810 combination is arranged so that the lid 1510 is completely nestled down inside of the filter container 810, preferably by resting it on a supporting ledge at the upper periphery of filter 150. Thus, any moisture that accumulates on the underside of the lid 1510 is returned to the inside of the filter 150 rather than to the ground outside.

Turning now to FIGS. 15 through 20, according to another preferred embodiment of the instant invention there is provided a skimmer 1500 apparatus that has a snout 1550 which may be shortened according to the desires of an end-user, thereby effectively widening it. As can best be seen in FIGS. 16 and 17, the instant snout 1550 is preferably designed in a "stair step" configuration, wherein sidewalls 1560 and 1565 are inset with respect to side walls 1570 and 1575, thereby causing the snout 1550 to progressively narrow the snout floor 1590 as it extends outwardly from the skimmer 1500. Additionally is preferably provided basket ledge 1580 which is designed to allow a conventional skimmer basket (such as that illustrated in FIG. 1) to be rested thereon or hung therefrom.

In operation, a user preferably adjusts the width of the snout 1550 by removing a portion of its terminus. Since in the preferred embodiment the instant snout 1550 will be made of a relatively stiff material such as plastic, the snout will preferably be removed by cutting it with a conventional hand or electric saw. As is best illustrated in FIGS. 18 through 20, if the user removes the portion of the snout terminus associated with sidewalls 1560 and 1565 from the instant invention (e.g., by laterally cutting the snout 1550 anywhere along sidewalls 1570 and 1575), the opening that results will be wider than that which was originally provided. FIG. 18 illustrates a preferred original configuration and FIG. 19 illustrates the same embodiment after sidewalls 1560 and 1565 have been removed, thereby shortening and widening the snout opening. FIG. 20 (in comparison with FIG. 16) illustrates most clearly the resulting configuration after removal of the snout terminus. As can be seen from these figures, snout floor 1590 has been shortened, but the resulting opening is now substantially wider and provides the skimmer with a greater capacity for taking water from the pool into the skimmer 150.

Finally, it should be noted and remembered that although the preferred adjustable snout embodiment 1500 includes two "stair steps" or wall segments—which corresponds to two different snout opening widths—those of ordinary skill in the art will recognize that the number of wall segments/opening sizes that is used is purely a design decision and is not essential to the operation of the instant invention. Additionally, although the instant inventor contemplates that the snout 1550 will preferably be shortened by cutting it (preferably with a hand or power saw), it is certainly possible, and well within the scope of the instant disclosure, that the snout might be scored or perforated to make it possible to shorten it by snapping off one or more wall segments. Finally, the instant inventor contemplates that in some circumstances it might be desirable to make it possible for the snout wall segments and snout floor to be reattached, thereby later narrowing the opening to its original width.

CONCLUSIONS

There has been provided herein an improved system for skimming and filtering within ornamental pools and the like. Of course, the instant inventor has contemplated many variations of the particular embodiments discussed herein, which would be within the scope of the claims that follow. For example, although the preferred embodiment of the instant invention utilizes a submersible pump in the skimmer apparatus, that is not strictly required. All that is necessary is that the skimmer 100 contain a vacuum source that draws water into skimmer 100 and past basket 130.

It should be further noted and remembered that when the term skimmer basket is used herein in connection with a preferred skimming embodiment that term should be interpreted in its broadest sense to include rigid baskets constructed of materials such as plastic, as well as flexible baskets or woven nets that are suspended within the skimmer by a semi-rigid frame. What is essential for purposes of the instant invention, though, is that the instant basket provide coarse filtering of the larger debris that might be collected from the surface of the body of water which is serviced by the skimmer. That being said, the preferred basket embodiment is, as has been explained previously, a rigid plastic basket that sits within the skimmer below its mouth.

Further, the term "filtering" as used herein should also be broadly construed to include the removal of debris of any size from the water, including very large (e.g., leaves) as well as very small (e.g., dust and dirt) particles from the water.

Additionally, although in the preferred embodiment the bifurcating partition is generally vertically disposed, it will be recognized by those of ordinary skill in the art that there is no particular need for it to be exactly vertical and it could, for example, be tilted to one side or the other, thereby creating asymmetric chambers within the skimmer. Thus, when this component of the instant invention is described herein as being vertically disposed, that description should be interpreted in its broadest sense to include substantial deviations from exact verticality. Further, although the preferred embodiment is a planar partition, it should be clear that this configuration is not an absolute requirement and any sort of shape (e.g., curved, piece-wise planar, cylindrical, etc.) would be suitable for use with the instant invention provided that it divides the interior of the skimmer into at least two chambers (one of which contains the basket/weir and the other of which contains the pump) and, further that the partition contains apertures only in its lower portion through which pond water may move to reach the pump.

Still further, although the preferred embodiment of the instant skimmer is generally box-like in appearance, it should be noted that this shape is only the preferred embodiment. Those of ordinary skill in the art will recognize that many other shapes could be used in the alternative including, by way of specific example, a generally cylindrical shape which is flared near its lower terminus (e.g., think of an Erlenmeyer flask).

Finally, as has been described previously the lateral support members 170 preferably take the form of cylindrical tubes of plastic that are separately supported at different points inside the filter body. However, those skilled in the art will recognize that the these members 170 need not necessarily be discrete units and could instead take the form of a support grid or similar arrangement. What is essential, though, is that the support members 170 bear the weight of the filter pack(s) 160 and other filtering elements above, and that the support member 170, whatever its form, allow water to flow freely upward and into the filtering elements. Thus, when the term "support member" is used hereinafter, it should be interpreted in its broadest sense to include multiple/discrete support members as well as a single member that contacts/supports the filtering elements at multiple points.

While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A skimming apparatus for use in removing near surface debris from a captive body of water, comprising:

(a) a skimmer body, said skimmer body having an interior, an upper portion, a lower portion, and a lower terminus, (a1) said body upper portion having at least one intake aperture therein for receiving water drawn from the water surface into said body interior, (a2) said skimmer body having at least one discharge orifice therein for returning water drawn from the water surface to the body of water, wherein said body upper portion has an upper perimeter, and said body lower portion has a lower perimeter, and, wherein said lower perimeter is great than said upper perimeter so that said skimmer body is outwardly flared proximate to its lower terminus.

2. A skimming apparatus according to claim 1, further comprising:

(b) a porous basket positionable to be within said skimmer body interior, said basket for receiving and filtering water drawn into said interior of said body and passing said water therethrough.

3. A skimming apparatus according to claim 2, further comprising:

(c) a pump positionable to be within said body interior,
(c1) said pump being in fluid communication with the body of water via said porous basket and said intake aperture,
(c2) said pump for drawing water from the body of water into said interior of said skimmer body, and,
(c3) said pump being in fluid communication with said discharge orifice and providing water drawn into said skimmer body under pressure to said discharge orifice for return to the body of water.

4. A skimming apparatus according to claim 3, wherein said pump is a submersible pump.

5. A skimming apparatus according to claim 3, wherein said porous basket is a rigid basket formed of plastic.

6. A skimming apparatus according to claim 3, further comprising:

(d) a weir affixed to said skimmer body within said skimmer body interior, said weir being proximate to said intake aperture and above said basket, said weir for receiving water drawn from the body of water into said skimmer body.

7. A skimming apparatus according to claim 1, wherein said skimmer body lower portion is positionable to be in contact with the body of water and wherein said skimmer body lower portion has a weep hole therein proximate to said lower terminus, said weep hole positionable to be in fluid communication with the body of water and said weep hole for allowing the passage of water from the body of water directly into said interior of said skimmer body and to said pump without passing through the body aperture and porous basket.

8. A skimmer for use with a captive body of water having a surface, comprising:

(a) a skimmer body, said skimmer body having an interior and an upper portion and a lower portion,
(a1) said body upper portion having at least one intake aperture therein for receiving water drawn from the water surface into said body interior;

(b) a porous basket mounted within said skimmer body interior, said basket for receiving and filtering water drawn into said interior of said body;

(c) a pump positionable to be within said body interior,
(c1) said pump being in fluid communication with the body of water, said pump drawing water into said intake aperture from the body of water and through said porous basket, and,
(c2) said pump having a discharge orifice for return the water drawn into said skimmer body interior back to the body of water; and, (d) a vertically disposed partition dividing said skimmer body interior into at least two chambers, said partition having an upper end and a lower end, said partition upper end portion being substantially impervious to the passage of water therethrough, and said lower end of said partition containing at least one aperture therethrough, wherein
(d1) a first chamber of said at least two chambers contains said skimmer intake aperture and said basket,
(d2) a second chamber of said at least two chambers is configured to receive said pump therein, and,
(d3) said first chamber and said second chamber are in fluid communication only through said at least one intake apertures.

9. A skimming apparatus according to claim 8, wherein said pump is a submersible pump.

10. A skimming apparatus according to claim 8, wherein said porous basket is a rigid basket formed of plastic.

11. A skimming apparatus according to claim 8, further comprising:

(e) a weir affixed to said skimmer body within said skimmer body interior, said weir being proximate to said skimmer intake aperture and above said basket, said weir for receiving water drawn from the body of water into said skimmer body.

12. A skimming apparatus according to claim 8, wherein said skimmer body lower portion is positionable to be in contact with the body of water and wherein said skimmer body lower portion has a weep hole placed therein, said weep hole positionable to be in communication with the body of water and said weep hole for allowing the passage of water from the body of water directly into said interior of said skimmer body and to said pump without passing through said intake aperture and said porous basket.

13. A filtering apparatus for use with an ornamental pond having water therein, comprising:

(a) a filter body, said filter body having an interior, an upper portion, and a lower portion,
(a1) said body upper portion having at least one discharge passageway therein for returning filtered water to said pond, and,
(a2) said body lower portion having at least one water intake orifice therein, said water intake orifice for receiving water from the pond;

(b) a horizontally disposed diffusing line within said filter body connected to said water intake orifice, said diffusing line having a plurality of laterally oriented apertures therein for smoothly distributing the water from said water intake orifice into said filter body lower portion, thereby creating a sedimentation chamber within said body lower portion therebeneath;

(c) filtering media positionable to be above said diffusing line, said filtering media for filtering said water taken from said pond;

(d) a support member, said support member for supporting said filtering media above said diffusing line; and, (e) a backwash orifice within said filter body lower portion, said backwash orifice for removing water from said body lower portion, thereby at least partially cleaning said sedimentation chamber.

14. A filtering apparatus for use with an ornamental pond having water therein according to claim 13, wherein said at least one discharge passageway for returning filtered water to the pond is a snout extending from said filter body.

15. A filtering apparatus for use with an ornamental pond having water therein according to claim 14, wherein said snout is integral to said filter body.

16. A filtering apparatus for use with an ornamental pond having water therein according to claim 14, and further for use with a pond liner, comprising:
- (f) a locking channel formed beneath said snout and between said snout and said filter body; and,
- (g) a spline positionable to be removably placed within said locking channel,
  - (g1) said spline for engaging at least a portion of a periphery of the pond liner, and
  - (g2) said spline being sized so as fit within said locking channel when the pond liner is so engaged, thereby supporting the engaged portion of the pond liner periphery when so engaged.

17. A filtering apparatus for use with an ornamental pond having water therein, wherein is provided a pond liner, comprising:
- (a) a filter body, said filter body having an interior and a base,
  - (a1) said filter body having at least one water intake orifice therein, said water intake orifice for receiving water taken from the pond;
- (b) a snout integral to said filter body,
  - (b1) said snout extending outwardly from said filter body, and
  - (b2) said snout for returning filtered water to said pond;
- (c) filtering media positionable to be between said water intake orifice and said snout, said filtering media for filtering said water taken from said pond;
- (d) a support member, said support member for supporting said filtering media above said filter body base;
- (e) a locking channel formed beneath said snout and between said snout and said filter body; and,
- (f) a spline positionable to be removably inserted within said locking channel,
  - (f1) said spline for engaging at least a portion of a periphery of the pond liner, and
  - (f2) said spline being sized so as fit within said locking channel when the pond liner periphery is so engaged, thereby supporting the engaged portion of the pond liner periphery.

18. A filtering apparatus for use with an ornamental pond having water therein comprising:
- (a) a filter body, said filter body having an interior, an upper periphery and a base,
  - (a1) said filter body having at least one water intake orifice therein, said water intake orifice for receiving the water taken from the pond,
  - (a2) said upper periphery of said filter body forming an aperture therthrough, said aperture for providing access to said interior of said filter body;
- (c) a snout affixed to said filter body,
  - (b1) said snout extending outwardly from said filter body, and
  - (b2) said snout for returning filtered water to said pond;
- (c) filtering media positionable to be between said water intake orifice and said snout, said filtering media for filtering said water taken from said pond;
- (d) a support member, said support member for supporting said filtering media above said filter body base; and,
- (e) a filter cover, said filter cover positionable to be fitted completely within said filter upper periphery.

19. A skimming apparatus for use in removing near surface debris from a captive body of water, wherein said skimming apparatus is adapted for placement within the body of water, comprising:
- (a) a skimmer body, said skimmer body having an interior, an upper portion, a lower portion, and a lower terminus,
  - (a1) said body upper portion having at least one intake aperture therein for receiving water drawn from the water surface into said body interior,
  - (a2) said skimmer body having at least one discharge orifice therein for returning water drawn from the water surface to the body of water;
- (b) a porous basket positionable to be within said skimmer body interior, said basket for receiving and filtering water drawn into said interior of said body and passing said water therethrough.
- (c) a pump positionable to be within said body interior,
  - (c1) said pump being in fluid communication with the body of water via said porous basket and said intake aperture,
  - (c2) said pump for drawing water from the body of water into said interior of said skimmer body, and,
  - (c3) said pump being in fluid communication with said discharge orifice and providing water drawn into said skimmer body under pressure to said discharge orifice for return to the body of water; and,
- (d) a weep hole within said skimmer body lower portion and proximate to said skimmer body lower terminus,
  - (d1) said weep hole positionable to be in fluid communication with the body of water, and
  - (d2) said weep hole for allowing the passage of water from the body of water directly into said interior of said skimmer body and to said pump without passing through said intake aperture and said porous basket.

20. A skimming apparatus according to claim 19, wherein said pump is a submersible pump.

21. A skimming apparatus according to claim 19, wherein said porous basket is a rigid basket formed of plastic.

* * * * *